United States Patent [19]
Finnila et al.

[11] Patent Number: 5,847,784
[45] Date of Patent: Dec. 8, 1998

[54] SELF ADJUSTING TILED PROJECTOR USING TEST PATTERN AND SENSOR

[75] Inventors: Ronald M. Finnila; Donald C. Mead, both of Carlsbad, Calif.

[73] Assignee: Hughes Electronics Corporation, Los Angeles, Calif.

[21] Appl. No.: 902,022

[22] Filed: Jul. 29, 1997

[51] Int. Cl.$^6$ ............ G02F 1/1333; G02F 1/1335; H04N 3/22; H04N 3/223
[52] U.S. Cl. .................. 349/73; 349/56; 349/8; 349/192; 348/745; 348/747; 345/1; 353/34
[58] Field of Search ............. 349/7, 8, 56, 73, 349/192; 345/1; 348/745, 747, 750, 751; 353/34

[56] References Cited

U.S. PATENT DOCUMENTS

| | | | |
|---|---|---|---|
| 5,020,116 | 5/1991 | Macaulay | 382/44 |
| 5,434,595 | 7/1995 | Macaulay | 345/207 |
| 5,465,121 | 11/1995 | Blalock et al. | 348/744 |
| 5,555,035 | 9/1996 | Mead et al. | 348/757 |
| 5,742,698 | 4/1998 | Minami et al. | 382/100 |

Primary Examiner—William L. Sikes
Assistant Examiner—Kenneth Parker
Attorney, Agent, or Firm—Terje Gudmestad; Georgann S. Grunebach; Michael W. Sales

[57] ABSTRACT

A self adjusting tiled image display system and method is provided. In operation, an image source having an array of tiled image displays projects a test image pattern. A positioning device is attached to a corresponding one of the image displays for positioning that image display. A sensor senses the test image pattern projected by the image displays and generates a sensor signal indicative of the sensed test image pattern. A processor compares the sensor signal to a proper alignment signal indicative of the image displays being properly aligned to generate a positioning signal. The processor applies the positioning signal to the positioning devices to position the image displays as a function of the positioning signal until the image displays are in the proper alignment.

20 Claims, 4 Drawing Sheets

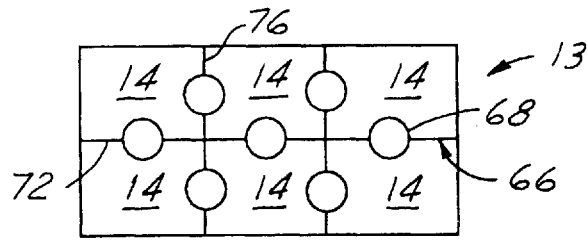
FIG. 3
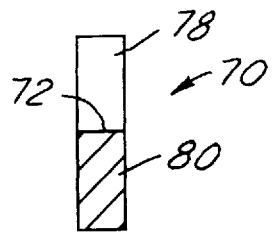 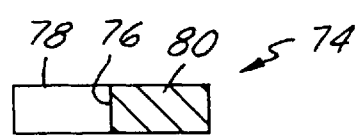
FIG. 4a  FIG. 4b
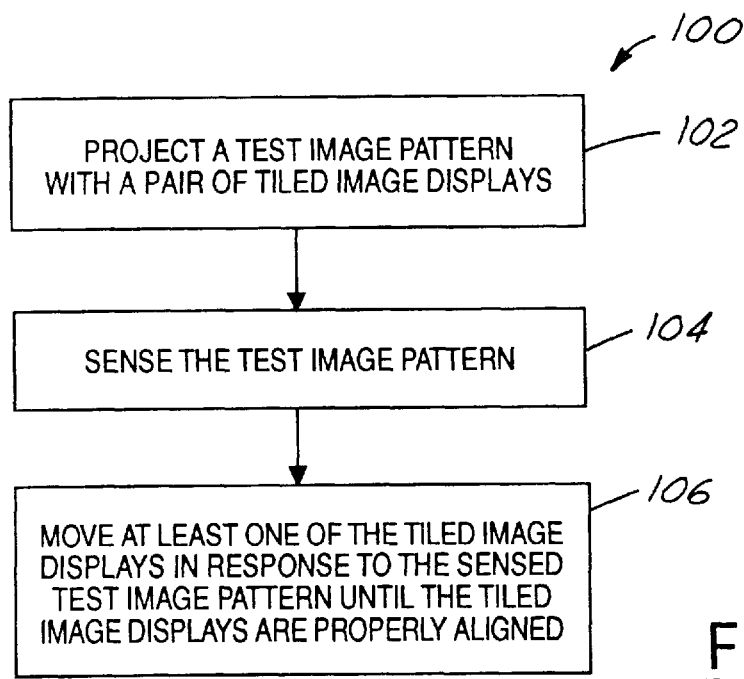
FIG. 6

SELF ADJUSTING TILED PROJECTOR USING TEST PATTERN AND SENSOR

TECHNICAL FIELD

The present invention relates to image display systems, and more particularly, to image display systems for displaying relatively large high resolution images that use alignable small tiled or mosaic-like displays.

BACKGROUND ART

Tiling small displays to form larger displays having a relatively large number of pixels has been an objective of large-size display development for a number of years. Up until recently, prior art attempts to develop such large high resolution displays using observation (image) space have failed. In most attempts, regardless of how small the seams, the zone, or the area between the tiles have been made, they have been observable and objectionable to viewers.

Prior art approaches include conventional tiling approaches, including direct view cathode ray tube (CRT) mosaic-like displays (i.e., stacked monitors) commonly known as a video wall. This approach has significant disadvantages including severe and large opaque borders or seams between the constituent displays that make up the image.

Another approach includes direct projection of smaller CRT images. This approach tends to produce considerable light fall-off and non-uniformity between the tiles of the tiled displays, and requires a relatively complex feathering scheme or intensity matching between the tiles of the tiled displays at the edges of the individual images.

Additionally, there is a direct view tiled flat panel display, known as the French Matra Grand X display. This display shows considerable intensity variation between the tiles that make up the complete display. Also, there is a noticeable demarcation between the tiles, although it is considerably less than the conventional stacked CRT video wall approach.

A smaller CRT projection system has the disadvantages mentioned above, as well as a limited light output, unless an unreasonably large number of CRTs are used (especially when considering color). This occurs because the illumination source and the object source are one and the same.

However, a successful attempt in developing large high resolution displays using observation space has succeeded. Projection display systems that project relatively large high resolution images using small tiled or mosaic-like displays and that overcome the limitations of conventional display systems such as those mentioned above have been disclosed in U.S. Pat. No. 5,555,035 ("the '035 patent"). The '035 patent is assigned to the assignee of the present invention and is incorporated in its entirety herein by reference.

The '035 patent discloses a projection display system that uses optically tiling of image sources in object space. The tiled image is written or projected onto a photoactivated reflective liquid crystal light valve. When the tiles are aligned so that the seams are a small fraction of a pixel, the light valve, to a high degree, spatially low pass filters the tiled image, thereby eliminating the seams, and minimizing any tiling artifacts in observation (image) space.

However, there exists a need to provide a simple approach to initially align the tiles during manufacturing and initial calibration of the projection display system. Also, because the tiles may become misaligned during use of the projection display system, there also exists a need to provide a simple approach to align the tiles during operation of the system. If the tiles are not properly aligned, then the seams may be larger than the small fraction of a pixel. Consequently, the light valve is not able to spatially low pass filter the tiled image as effectively as before and eliminate the seams to minimize the tiling artifacts in observation (image) space.

SUMMARY OF THE INVENTION

Accordingly, it is an object of the present invention to provide a self-adjusting projection display system having alignable tiled image displays.

It is another object of the present invention to provide a self-adjusting projection display system having tiled image displays which are alignable during operation of the display system.

It is still another object of the present invention to provide a self-adjusting projection display system having tiled image displays which are alignable during calibration of the display system.

It is still yet another object of the present invention to provide a self-adjusting projection display system having positioning devices associated with tiled image displays for positioning the tiled image displays for proper alignment.

It is a further object of the present invention to provide a self-adjusting projection display system having tiled image displays projecting a test image pattern which is sensed to determine whether the tiled image displays are properly aligned.

It is still a further object of the present invention to provide a self-adjusting projection display system having tiled image displays which are moved and positioned until the sensed test image pattern is indicative of the tiled image displays being properly aligned.

In carrying out the above objects and other objects, features, and advantages of the present invention, a method for properly aligning the tiled image displays of a projection display system is provided. The method is for use with a projection display system provided with an image source having an array of tiled image displays for projecting images. The projection display system is further provided with a photoactivated reflective liquid crystal light valve having an input surface for receiving the projected images and an output surface for reflecting illumination light onto a display screen to project a display image on the display screen.

The method includes projecting a test image pattern from the array of tiled image displays. Next, the test image pattern is sensed along optical paths of the images projected by the array of tiled image displays at a position corresponding to the proper alignment of the test image pattern. Then, a sensor signal indicative of the sensed test image pattern is provided. The sensor signal is compared to a proper alignment signal to generate a positioning signal. The proper alignment signal is indicative of the tiled image displays being properly aligned. The tiled image displays are positioned as a function of the positioning signal until the tiled image displays are in the proper alignment.

Further, in carrying out the above objects, a self adjusting projection display system is provided. The display system includes an image source having an array of tiled image displays. The array of tiled image displays projects a test image pattern. The system further includes a photoactivated reflective liquid crystal light valve disposed along optical paths of images projected by the tiled image displays which are imaged onto an input surface thereof. The reflective light valve has an output surface for reflecting illumination light onto a display screen to project a display image on the display screen.

The system further includes a plurality of positioning devices. Each one of the positioning devices is attached to a corresponding one of the tiled image displays for positioning that tiled image display. A sensor is disposed along optical paths of the images projected by the tiled image displays. The sensor is positioned at a location corresponding to the proper alignment of the test image pattern for sensing the test image pattern projected by the array of tiled image displays. The sensor provides a sensor signal indicative of the sensed test image pattern.

The system further includes a processor operable with the sensor and the positioning devices. The processor compares the sensor signal to a proper alignment signal indicative of the tiled image displays being properly aligned to provide a positioning signal to the positioning devices. The positioning devices position the tiled image displays as a function of the positioning signal until the tiled image displays are in the proper alignment.

The advantages accruing to the present invention are numerous. For example, the self adjusting projection display system is economically viable because the tiled image displays may be aligned during operation and manufacture of the system. Accordingly, the projection display system is not unduly sensitive to real world applications.

These and other features, aspects, and embodiments of the present invention will become better understood with regard to the following description, appended claims, and accompanying drawings.

BRIEF DESCRIPTION OF THE DRAWINGS

FIG. 3 illustrates the location of test image patterns between tiled image displays;

FIG. 4a illustrates a simple test image pattern for a horizontal crack between a pair of tiled image displays;

FIG. 4b illustrates a simple test image pattern for a vertical crack between a pair of tiled image displays;

FIG. 6 illustrates a flow diagram representing operation of a projection display system according to the present invention;

BEST MODES FOR CARRYING OUT THE INVENTION

Figure 1:
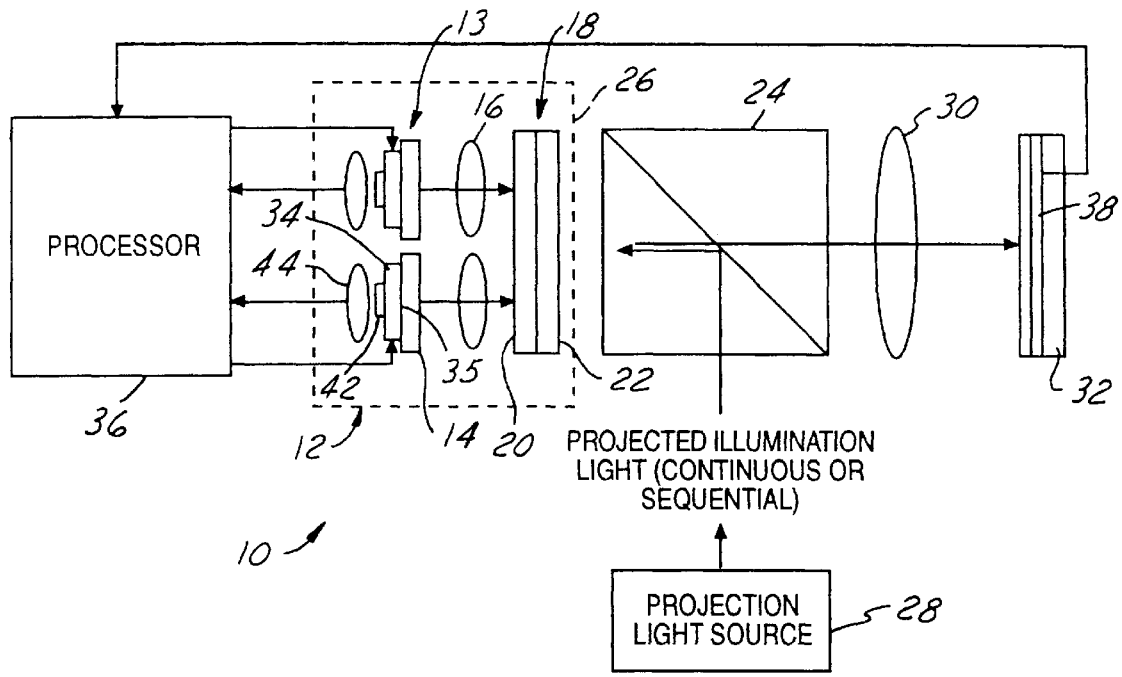
FIG. 1 illustrates a projection display system according to a first embodiment of the present invention.

Referring now to FIG. 1, a self adjusting projection display system 10 is shown. Display system 10 includes an image source 12 having an array 13 of tiled image displays 14. Image displays 14 are disposed in an object space of display system 10. Each of image displays 14 may be comprised of such devices such as flat panel displays or active matrix light valves. Relay optics 16 such as lenses are disposed along the respective optical paths of images projected by image displays 14. A photoactivated reflective liquid crystal light valve 18 is disposed along the optical paths of the respective images relayed by relay optics 16. Images projected by image displays 14 are imaged onto an input surface 20 of reflective light valve 18. Reflective light valve 18 also has an output surface 22.

A polarizing beamsplitter 24, or polarizing beamsplitter prism 24, is disposed adjacent an output surface 26 of image source 12 at output surface 22 of light valve 18. Projection illumination light is provided by an illumination source 28 and is projected by way of polarizing beamsplitter prism 24 onto output surface 22 of reflective light valve 18. The illumination light is reflected from output surface 22 of reflective light valve 18 back through polarizing beamsplitter prism 24 and is imaged using a projection lens 30 onto a display screen 32 located in image space. The projection light produced by illumination source 28 may be continuous or sequentially imaged monochrome or red-green-blue (RGB) light.

Images projected by image displays 14 serve as the object for reflective light valve 18. Reflective light valve 18 modulates the incident high intensity projection illumination light permitting projection of a display image on display screen 32. Reflective light valve 18 spatially low pass filters the projected images and thereby eliminates the seams between image displays 14 when the image displays are properly aligned.

Display system 10 further includes positioning devices 34 associated with image displays 14 to move the image displays to the proper alignment. Positioning devices 34 are attached to a rear surface 35 of image displays 14. Positioning devices 34 are preferably piezoelectric positioning devices which deform under the application of an electric field. For example, applying a positive electric potential across a piezoelectric positioning device may cause an elongation of the positioning device. Correspondingly, applying a negative electric potential across the piezoelectric positioning device may cause a contraction of the positioning device. Consequently, by applying various types of electric potentials to positioning devices 34, image displays 14 may be moved and positioned.

By configuring positioning devices 34 in different orientations with respect to image displays 14, the image displays may be moved and tilted in various directions such as rotationally and translationally. In alternative embodiments, positioning devices are servo-mechanical displacement mechanisms, precision stepping motors or the like.

A controller or processor 36 operable with positioning devices 34 controls the positioning of image displays 14. Processor 36 includes a programmable logic controller or the like for applying various electric potentials to positioning devices 34 to move image displays 14. Processor 36 moves image displays 14 with the intention of reducing the tiling artifacts in observation (image) space. The tiling artifacts are greatly reduced or eliminated when image displays 14 are properly aligned. Accordingly, processor 36 moves image displays 14 to the proper alignment.

The proper alignment of image displays 14 is determined in accordance with the following operation. Image displays 14 are adapted to project test image patterns. The test image patterns are specific optical illumination patterns which function as fiducial patterns (alignment targets). The test image patterns are sensed by optical sensors positioned at locations corresponding to the proper alignment of the test image patterns which are projected on them. In short, image displays 14 are moved until the sensed test image pattern indicates that the image displays are properly aligned.

Specifically, the sensors generate an electronic signal having a magnitude proportional to the strength of the sensed test image pattern. Image displays 14 are properly aligned when the magnitude of the signal is peaked and further translative or rotative movement of the image displays causes the magnitude to decrease. When image displays 14 are properly aligned, the magnitude of the signal is at the highest possible value meaning that the entire test image pattern is being sensed by the sensor. As a result, the sensed test image pattern is the same as the test image pattern.

In carrying out the above sensing operation, display system 10 includes an optical sensor 38 for sensing the test image pattern projected by image displays 14. Sensor 38 is preferably an array of photo diodes or the like. Sensor 38 is operable with processor 36 to align image displays 14 either during a set-up (calibration) period or during the real-time operation of display system 10.

Depending on which mode of operation is being performed, sensor 38 is positioned within display system 10 differently. Also, depending on which mode of operation is being performed, the test image patterns are projected from different areas of image displays 14. Furthermore, as will be discussed in detail, test image patterns may be projected by other devices other than image displays 14 such as self illuminating targets.

I. Alignment Performed During Calibration Period

Proper alignment of image displays 14 can be achieved during a set-up or calibration interval. During the calibration interval, the image field of image displays 14 is not displayed to the viewer. Accordingly, there are no display images for the viewer on display screen 32. At the beginning of the calibration period, sensor 38 is inserted along optical paths of images projected from image displays 14. As shown in FIG. 1, sensor 38 is disposed within display screen 32. Sensor 38 is rigidly positioned at a location corresponding to the proper alignment of the test image pattern that is projected on it by image displays 14.

Image displays 14 are then driven to project a specific optical illumination pattern, i.e., a test pattern image, on sensor 38. Sensor 38 generates a sensor signal indicative of the magnitude of the sensed test image pattern. Sensor 38 provides the sensor signal to processor 36.

Processor 36 includes a microprocessor or comparator for comparing the sensor signal to a proper alignment signal. The proper alignment signal is indicative of image displays 14 being properly aligned. Processor 36 generates a positioning signal as a function of the difference between the sensor signal and the proper alignment signal.

Processor 36 provides the positioning signal to positioning devices 34. As a function of the positioning signal, positioning devices 34 move image displays 14 until the image displays are properly aligned. Alignment is complete when the difference between the sensor signal and the proper alignment signal is minimized and further movement of image displays 14 causes the difference to increase.

Sensor 38 is shown in FIG. 1 as being inserted within display screen 32. This is done merely for illustrative purposes. Sensor 38 may be positioned along various locations so long as it is disposed along optical paths of the images projected by image displays 14. For instance, sensor 38 may be interposed between output surface 22 of reflective light valve 18 and display screen 32 (not specifically shown in FIG. 1). As another example, sensor 38 may be interposed between image displays 14 and input surface 20 of reflective light valve 18 (not specifically shown in FIG. 1). However, depending on the location of sensor 38, the sensor needs to be withdrawn along from the optical paths of the images projected by image displays 14 after alignment so that a display image may be displayed on display screen 32.

A primary advantage of aligning image displays 14 during the calibration period is that the test image patterns are only projected during calibration. Accordingly, after alignment and during operation of display system 10, the entire image field of image displays 14 may be used for projecting images for display on display screen 32. In short, no test image patterns which use up a portion or all of the image field of image displays 14 are projected after alignment.

II. Alignment Performed Continuously In Real Time

A primary advantage of real time alignment of image displays 14 during operation of display system 10 is that the component images projected from the image displays are continuously adjusted to prevent distortion to the composite image. The composite image is the image generated by combining all of the individual component images. However, to avoid obstructing the projected images, the test image patterns and sensors 38 must be placed outside of an image area of image displays 14. The image area is the portion of the image field of image displays 14 which is used for projecting images for display on display screen 32.

Figure 7:
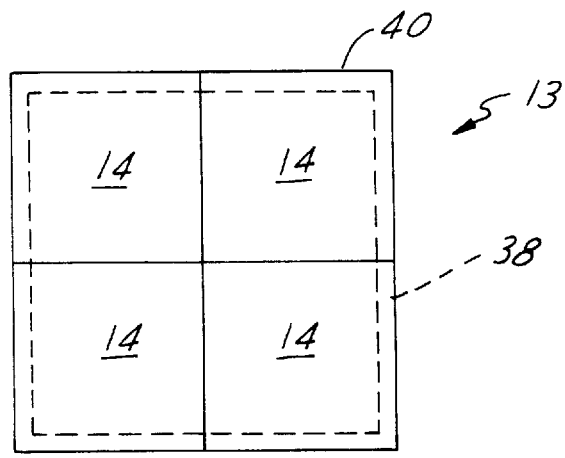
FIG. 7 illustrates an outer perimeter of an array of tiled image displays for projecting a test image pattern.

For instance, as shown in FIG. 7, a test image pattern can be projected along an outer perimeter 40 of array 13 of image displays 14. As a result, outer perimeter 40 cannot be used for projecting images for display on display screen 32. Thus, a small part of the total area (image field) of array 13 used for projecting display images is sacrificed.

Figure 8:
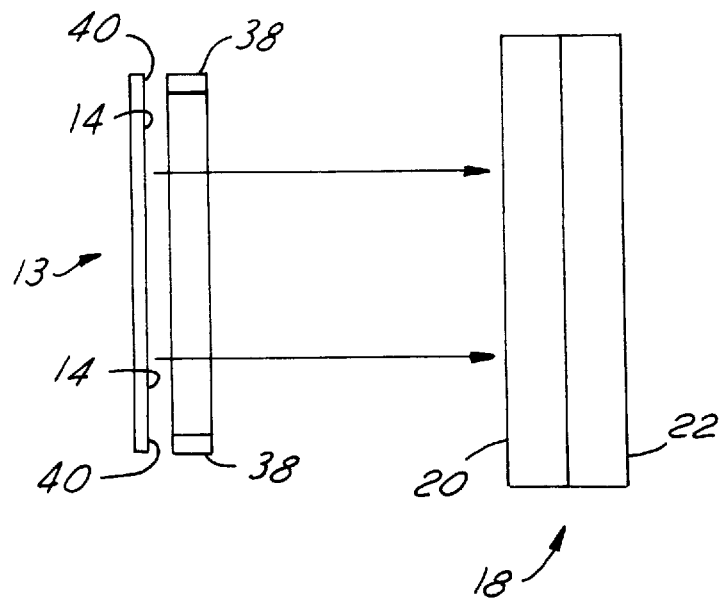
FIG. 8 illustrates sensors positioned directly in front of the outer perimeter of the array of tiled image displays.

As shown in FIG. 8, sensor 38 is placed in the image plane directly in front of outer perimeter 40 of array 13 for sensing the test image patterns while not obstructing the image area. In accordance with the procedure discussed above, sensor 38 provides a signal indicative of the sensed test image pattern. Processor 36 compares the sensor signal to the proper alignment signal to generate the positioning signal. Processor 36 provides the positioning signal 36 to positioning devices 34 to move image displays 14 to the proper alignment.

Placing the test image patterns and sensor 38 around outer perimeter 40 constrains the total size of the projected area because, as illustrated in FIG. 7, each one of image displays 14 must extend to the outer perimeter. Accordingly, aligning large arrays of tiled image displays having at least one image display surrounded on all sides by other image displays is not possible with this arrangement.

However, the present invention provides an arrangement suitable for aligning the image displays of a large array. As shown in FIG. 1, display system 10 may include self illuminating targets 42 and optical sensors 44. Each one of self illuminating targets 42 is attached to rear surface 35 of a corresponding one of image displays 14 for projecting a test image pattern.

As shown in FIG. 1, self illuminating targets 42 are integral with positioning devices 34. Of course, self illuminating targets 42 may be attached directly to a part or all of rear surface 35 of image displays 14 while positioning devices 34 are attached to another part of the rear surface or to the side of the image displays.

Sensors 44 are disposed behind image displays 14 adjacent self illuminating targets 42 and are positioned at a location corresponding to the proper alignment of the test image patterns. The feedback system for positioning image displays 14 is the same as discussed above. Basically, sensor 44 provides a sensor signal indicative of the sensed test image patterns. The sensor signal is compared to the proper alignment signal to generate a positioning signal. Image displays 14 are moved as a function of the positioning signal until the image displays are properly aligned.

Figure 2:
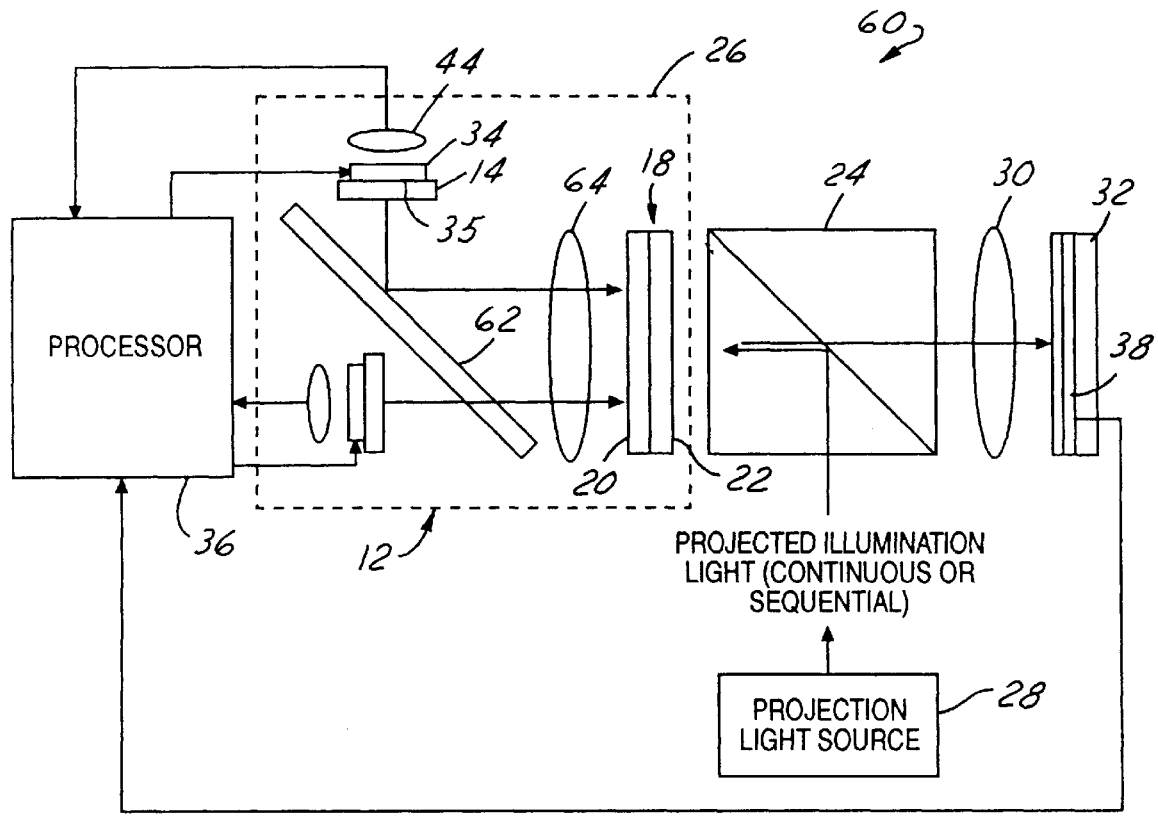
FIG. 2 illustrates a projection display system according to a second embodiment of the present invention.

Referring now to FIG. 2, a projection display system 60 is shown. Display system 60 includes many of the same elements as projection display system 10. Accordingly, identical elements have the same reference numeral in FIGS. 1 and 2. Display system 60 includes an image source 12. Image source 12 includes a plurality of tiled image displays 14. A beamsplitter 62 comprising a thin plate or pellicle is disposed in the optical paths of the respective images projected by image displays 14. Relay optics 64 comprising a single relay lens is disposed along the optical paths of images projected by image displays 14 through beamsplitter 62. A photoactivated reflective crystal light valve 18 is disposed in the optical paths of the respective images relayed by relay optics 64. The images projected by image displays 14 are imaged onto an input surface 20 of light valve 18.

Polarizing beamsplitter prism 24 is disposed adjacent output surface 26 of image source 12 at output surface 22 of light valve 18. Projection illumination light is provided by illumination source 28 and is projected by way of polarizing beamsplitter prism 24 onto output surface 22 of light valve 18. The projection light is reflected off from output surface 22 back through polarizing beamsplitter prism 24 and is imaged using projection lens 30 onto display screen 32. The projection illumination light provided by illumination source 28 may be continuous or sequentially imaged monochrome or red-green-blue (RGB) light.

Processor 36 controls positioning devices 34 to move image displays 14 to the proper alignment in response to the sensed test image patterns sensed by sensor 38 during the calibration mode and sensors 44 during the real time alignment mode for large arrays.

FIG. 3 illustrates a sample test image pattern which may be used during the calibration period. As shown, image displays 14 project test image patterns adjacent cracks, seams, or boundaries 66 between each pair of image displays as shown by reference numeral 68. For instance, FIG. 4a shows a simple test image pattern 70 for a horizontal crack 72 between a pair of image displays 14. Similarly, FIG. 4b shows a simple test image pattern 74 for a vertical crack 76 between a pair of image displays 14. Each of test image patterns 70 and 74 have a white portion 78 projected by one image display and a black portion 80 projected by another image display 14. White portion 78 and black portion 80, as well as the pair of image displays 14, are separated by cracks as shown.

In accordance with the teachings of the present invention, sensor 38 is positioned at a location corresponding to the proper alignment of the test image pattern. This means that when image displays 14 are properly aligned, sensor 38 receives the entire sample test image pattern with white portion 78 and black portion 80 separated by a crack.

Figure 5:
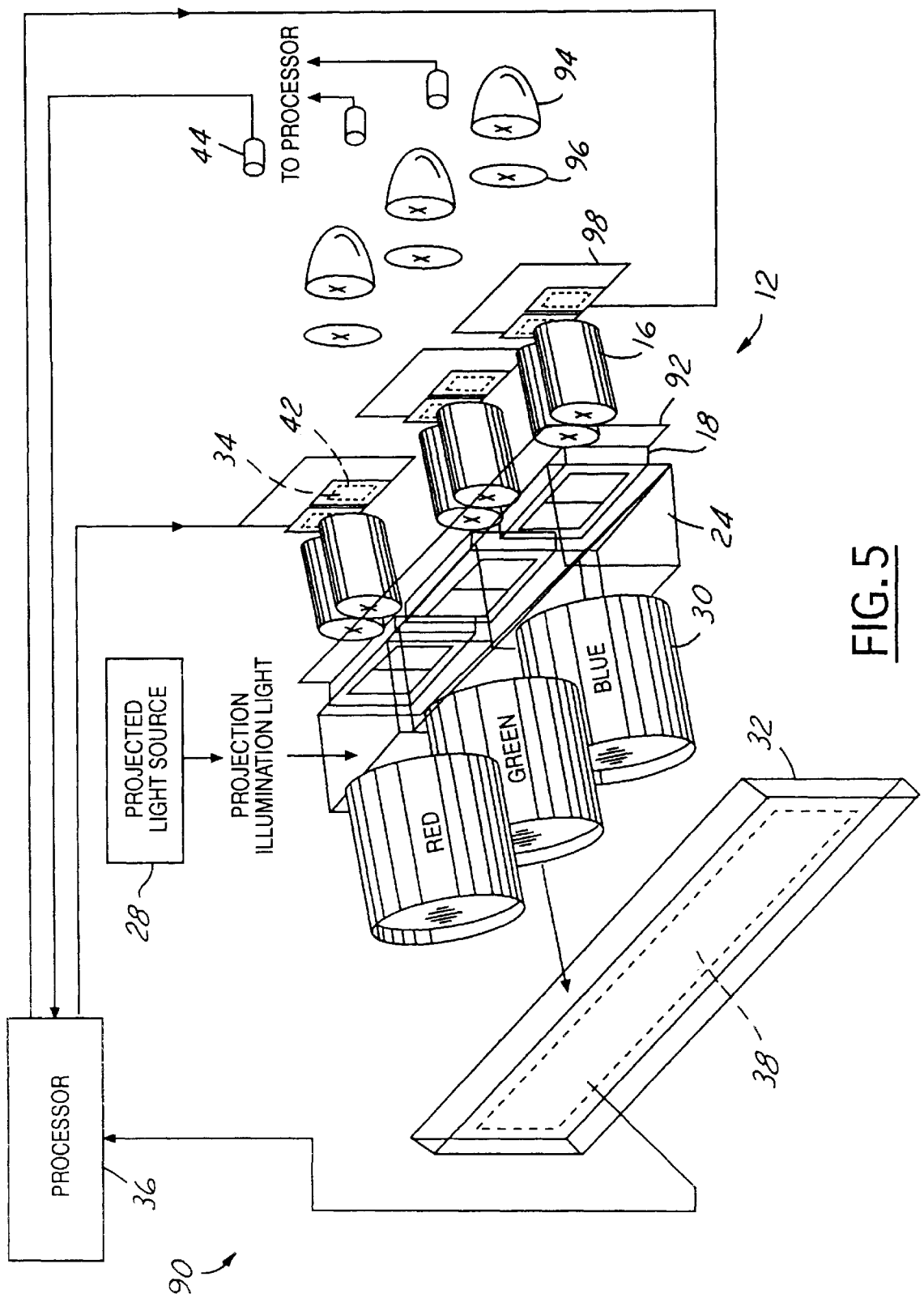
FIG. 5 illustrates an exploded view of a projection display system.

Referring now to FIG. 5, an exploded view of a projection display system 90 in accordance with the present invention is shown. Display system 90 comprises three color projectors that are suitable for providing high resolution large format projected images that are essentially seamless when observed by viewers. Display system 90 comprises substantially the same components as has been described in FIGS. 1 and 2. However, in addition, display system 90 includes analyzers 92 disposed between relay lenses 16 and input surface 20 of light valve 18, writing illumination sources 94 and condensing lenses 96 that form part of image source 12, and an input polarizer 98 disposed between condensing lenses 96 and light valve 18. For display system 90, the closed loop operation described above between processor 36, sensors 38 and 40, and positioning devices 34 for moving image displays 14 to the proper alignment is performed for each of the red, green, and blue color planes.

Referring now to FIG. 6, a flow diagram illustrating operation of the present invention is shown. In general, flow diagram 100 moves tiled image displays to the proper alignment by comparing a sensor signal to a proper alignment signal. The proper alignment signal is indicative of the image displays being properly aligned. Flow diagram 100 begins with block 102 projecting a test image pattern with tiled image displays such as a pair of image displays. Block 104 then senses the test image pattern projected by the pair of tiled image displays. The test image pattern is sensed along optical paths of images projected by the image displays at a position corresponding to the proper alignment of the test image pattern. The sensor signal is then compared to the proper alignment signal to generate a positioning signal. Block 106 then moves at least one of the pair of tiled image displays in response to the sensed test image pattern (the positioning signal) until the image displays are properly aligned.

It should be noted that the present invention may be used in a wide variety of different constructions encompassing many alternatives, modifications, and variations which are apparent to those with ordinary skill in the art. Accordingly, the present invention is intended to embrace all such alternatives, modifications, and variations as fall within the spirit and scope of the appended claims.

What is claimed is:

1. A self adjusting projection display system comprising:

an image source having an array of tiled image displays, the array of tiled image displays projects a test image pattern;

a photoactivated reflective liquid crystal light valve disposed along optical paths of images projected by the tiled image displays which are imaged onto an input surface thereof and having an output surface for reflecting illumination light onto a display screen to project a display image on the display screen;

a plurality of positioning devices, each one of the positioning devices is attached to a corresponding one of the tiled image displays for positioning that tiled image display;

a sensor disposed along optical paths of the images projected by the tiled image displays and positioned at a location corresponding to the proper alignment of the test image pattern for sensing the test image pattern projected by the array of tiled image displays, wherein the sensor provides a sensor signal indicative of the sensed test image pattern; and a processor operable with the sensor and the positioning devices, wherein the processor compares the sensor signal to a proper alignment signal indicative of the tiled image displays being properly aligned to provide a positioning signal to the positioning devices to position the tiled image displays as a function of the positioning signal until the tiled image displays are in the proper alignment.

2. The system of claim 1 wherein:

the test image pattern is projected along an entire surface of the array of tiled image displays.

3. The system of claim 2 wherein:
the sensor is withdrawn along from the optical paths of the tiled image displays when the tiled image displays are properly aligned so that the display image may be projected on the display screen.

4. The system of claim 2 wherein:
the sensor is disposed along optical paths of the images projected by the tiled image displays adjacent the display screen.

5. The system of claim 2 wherein:
the sensor is disposed along optical paths of the images projected by the tiled image displays within the display screen.

6. The system of claim 2 wherein:
the sensor is disposed along optical paths of the images projected by the tiled image displays interposed between the tiled image displays and the input surface of the photoactivated reflective liquid crystal light valve.

7. The system of claim 1 wherein:
the test image patterns are projected along an outer perimeter of the array of tiled image displays outside of an image area used for projecting images which form display images on the display screen.

8. The system of claim 7 wherein:
the sensor is disposed directly in front of the outer perimeter of the array of tiled image displays outside of the image area.

9. The system of claim 7 wherein:
alignment of the tiled image displays is performed continuously during projection of display images on the display screen.

10. The system of claim 1 wherein:
the positioning devices position the tiled image displays in a translative and rotative orientation.

11. The system of claim 1 wherein:
the positioning devices are piezoelectric positioning devices.

12. The system of claim 1 wherein:
the sensor includes at least one photodiode.

13. A self adjusting projection display system comprising:
an image source having an array of tiled image displays each having a front surface for projecting images;
a photoactivated reflective liquid crystal light valve disposed along optical paths of the images projected by the front surfaces of the tiled image displays which are imaged onto an input surface thereof and having an output surface for reflecting illumination light onto a display screen to project a display image on the display screen;
a plurality of positioning devices, each one of the positioning devices is attached to a corresponding one of the tiled image displays for positioning that tiled image display;
a plurality of self illuminating targets, each one of the self illuminating targets is attached to a rear surface of a corresponding one of the tiled image displays for projecting a test image pattern;
a sensor disposed adjacent the self illuminating targets and positioned at a location corresponding to the proper alignment of the test image patterns for sensing the test image patterns projected by the self illuminating targets, wherein the sensor provides a sensor signal indicative of the sensed test image patterns; and
a processor operable with the sensor and the positioning devices, wherein the processor compares the sensor signal to a proper alignment signal indicative of the tiled image displays being properly aligned to provide a positioning signal to the positioning de,ices to position the tiled image displays as a function of the positioning signal until the tiled image displays are in the proper alignment.

14. In a projection display system provided with an image source having an array of tiled image displays for projecting images and a photoactivated reflective liquid crystal light valve having an input surface for receiving the projected images and an output surface for reflecting illumination light onto a display screen to project a display image on the display screen, a method for properly aligning the tiled image displays, the method comprising:
projecting a test image pattern from the array of tiled image displays;
sensing the test image pattern along optical paths of the images projected by the array of tiled image displays at a position corresponding to the proper alignment of the test image pattern;
providing a sensor signal indicative of the sensed test image pattern;
comparing the sensor signal to a proper alignment signal to generate a positioning signal, wherein the proper alignment signal is indicative of the tiled image displays being properly aligned; and
positioning the tiled image displays as a function of the positioning signal until the tiled image displays are in the proper alignment.

15. The method of claim 14 wherein:
projecting a test image pattern from the array of tiled image displays comprises projecting the test image pattern along an entire surface of the array of tiled image displays.

16. The method of claim 15 wherein:
sensing the test image pattern along optical paths of images projected by the array of tiled image displays comprises sensing the test image pattern adjacent the display screen.

17. The method of claim 15 wherein:
sensing the test image pattern along optical paths of images projected by the array of tiled image displays comprises sensing the test image pattern adjacent the tiled image displays.

18. The method of claim 14 wherein:
projecting a test image pattern from the array of tiled image displays comprises projecting a test image pattern along an outer perimeter of the array of tiled image displays outside of an image area used for projecting images which form the display image on the display screen.

19. The method of claim 18 wherein:
sensing the test image pattern along optical paths of images projected by the array of tiled image displays comprises sensing the test image pattern directly in front of the outer perimeter of the array of tiled image displays outside of the image area.

20. The method of claim 18 wherein:
positioning the tiled image displays as a function of the positioning signal until the tiled image displays are properly aligned is performed continuously during operation of the projection display system and projection of display images on the display screen.

* * * * *